United States Patent [19]

Koguchi et al.

[11] Patent Number: 5,237,415
[45] Date of Patent: Aug. 17, 1993

[54] GHOST CANCELER WITH ADAPTIVE TRANSVERSAL FILTER

[75] Inventors: Tatsushi Koguchi, Iwai; Shigehiro Ito; Kazuyuki Ebihara, both of Toride; Yuji Nishi, Iwai, all of Japan

[73] Assignee: Victor Company of Japan, Ltd., Yokohama, Japan

[21] Appl. No.: 628,995

[22] Filed: Dec. 18, 1990

Related U.S. Application Data

[63] Continuation-in-part of Ser. No. 515,878, Apr. 27, 1990, abandoned.

[30] Foreign Application Priority Data

Apr. 27, 1989 [JP] Japan .................... 1-49947[U]
Apr. 27, 1989 [JP] Japan .................... 1-108420

[51] Int. Cl.⁵ ............................................ H04N 5/21
[52] U.S. Cl. ........................................ 358/167; 358/905
[58] Field of Search ...................... 358/167, 905, 36; 375/101

[56] References Cited

U.S. PATENT DOCUMENTS

| | | | |
|---|---|---|---|
| 4,303,895 | 12/1981 | Ohnishi et al. | 358/905 |
| 4,314,277 | 2/1982 | Pritchard et al. | 358/167 |
| 4,389,623 | 6/1983 | Onishi et al. | 358/905 |
| 4,502,077 | 2/1985 | Morotomi et al. | 358/167 |
| 4,559,560 | 12/1985 | Murata et al. | 358/167 |
| 4,564,952 | 1/1986 | Karabinis et al. | 375/101 |
| 4,575,857 | 3/1986 | Murakami | 358/905 |
| 4,583,120 | 4/1986 | Murakami et al. | 358/167 |
| 4,686,569 | 8/1987 | Campbell, III et al. | 358/167 |
| 4,912,557 | 3/1990 | Faroudja | 358/167 |
| 5,053,870 | 10/1991 | Ito et al. | 358/167 |
| 5,144,414 | 9/1992 | Nishi et al. | 358/36 |

FOREIGN PATENT DOCUMENTS 019273 8/1986 Japan .
0159885 6/1990 Japan .

*Primary Examiner*—James J. Groody
*Assistant Examiner*—Jeffrey S. Murrell
*Attorney, Agent, or Firm*—Pollock, VandeSande & Priddy

[57] ABSTRACT

A transversal filter filters an input video signal with a variable filtering characteristic. A waveform of a ghost cancel reference signal is periodically extracted from the input signal. An average of the successively-extracted waveforms is calculated. The filtering characteristic is determined on the basis of the calculated average of the extracted waveforms. An extracted waveform which is contaminated by an error or a jitter is rejected and is prevented from being used in the calculation of the average of the extracted waveforms.

5 Claims, 13 Drawing Sheets

GHOST CANCELER WITH ADAPTIVE TRANSVERSAL FILTER

CROSS-REFERENCES

This is a continuation-in-part of U.S. patent application, Ser. No. 515,878, filed on Apr. 27, 1990, now abandoned.

BACKGROUND OF THE INVENTION

This invention relates to a ghost canceler with an adaptive transversal filter which can be used in various television and video systems.

A known broadcast television signal has a ghost cancel reference signal which is generally shortened to a GCR signal. There are ghost cancelers designed to operate on such a television signal. In general, the ghost cancelers are used in television receivers. A ghost canceler in a television receiver detects a ghost in the received television signal by use of the GCR signal, and removes the ghost from the television signal in response to the detection of the ghost. The details of a GCR signal are explained in many documents such as Japanese Magazine "Nikkei Electronics", 1989 8.7 (No. 479), page 121, and Japanese Magazine "House Gijyutsu", April 1989.

It is know how to use an adaptive transversal digital filter in a ghost canceler. In a conventional ghost canceler using an adaptive transversal digital filter, a ghost cancel reference signal is extracted from an input video signal in response to a reference signal extracting pulse, and the filtering characteristic of the filter is determined on the basis of the extracted reference signal. The conventional ghost canceler tends to be adversely affected by a jitter of the reference signal extracting pulse and also a sudden error contaminating the reference signal.

Useful background information is described in Japanese Magazine "Radio Gijyutsu", December 1989, pages 188-192.

SUMMARY OF THE INVENTION

It is an object of this invention to provide an excellent ghost canceler with an adaptive transversal filter.

According to a first aspect of this invention, a ghost canceler comprises a transversal filter filtering an input video signal with a filtering characteristic determined by tap gains; a waveform extracting circuit periodically extracting a waveform of a first ghost cancel reference signal contained in the input video signal; an average circuit calculating an average of waveforms successively extracted and outputted by the waveform extracting circuit; a differentiating filter differentiating an output signal from the average circuit; a reference signal generator generating a second ghost cancel reference signal; a subtracter deriving a difference between an output signal from the differentiating filter and a waveform of the second reference signal; a magnification setting circuit setting a magnification in accordance with an output signal from the subtracter; a weight setting circuit generating weighting data on the basis of the output signal from the subtracter and the magnification set by the magnification setting circuit, the weight setting circuit setting the weighting data in the transversal filter as the tap gains; and a combination of an error check circuit, a band pass filter, a peak detector, and switch means connected between the waveform extracting circuit and average circuit; the error check circuit generating an NG signal when detecting that the output signal from the waveform extracting circuit has a level different from a predetermined error check threshold level; the band pass filter picking up a peak of the output signal from the waveform extracting circuit; the peak detector generating an NG signal when the peak picked up by the band pass filter is smaller than a predetermined reference level, the peak detector generating a peak position signal representing a position of the peak; switch means for outputting the output signal from the waveform extracting circuit when both the NG signal from the error check circuit and the NG signal from the peak detector are absent, and for outputting "0" when at least one of the NG signals from the error check circuit and the peak detector is present; the average circuit aligning the peak positions represented by the peak position signal from the peak detector during the calculation of the average.

According to a second aspect of this invention, a ghost canceler for a video signal containing periodically-occurring ghost cancel reference signals comprises a transversal filter filtering the video signal with a controllable filtering characteristic; means for extracting the ghost cancel reference signals from the video signal; means for determining whether each of the extracted ghost cancel reference signals is reliable or unreliable; and means for rejecting the unreliable ghost cancel reference signals and accepting the reliable ghost cancel reference signals, and for controlling the filtering characteristic on the basis of the accepted ghost cancel reference signals.

According to a third aspect of this invention, a ghost canceler for a video signal containing a ghost cancel reference signal comprises a transversal filter filtering the video signal with a variable filtering characteristic; means for initializing the filtering characteristic of the transversal filter to a predetermined filtering characteristic which passes a frequency band of the ghost cancel reference signal but cuts off signal components having frequencies higher than the frequency band of the ghost cancel reference signal.

DESCRIPTION OF THE FIRST PREFERRED EMBODIMENT

Figure 1:
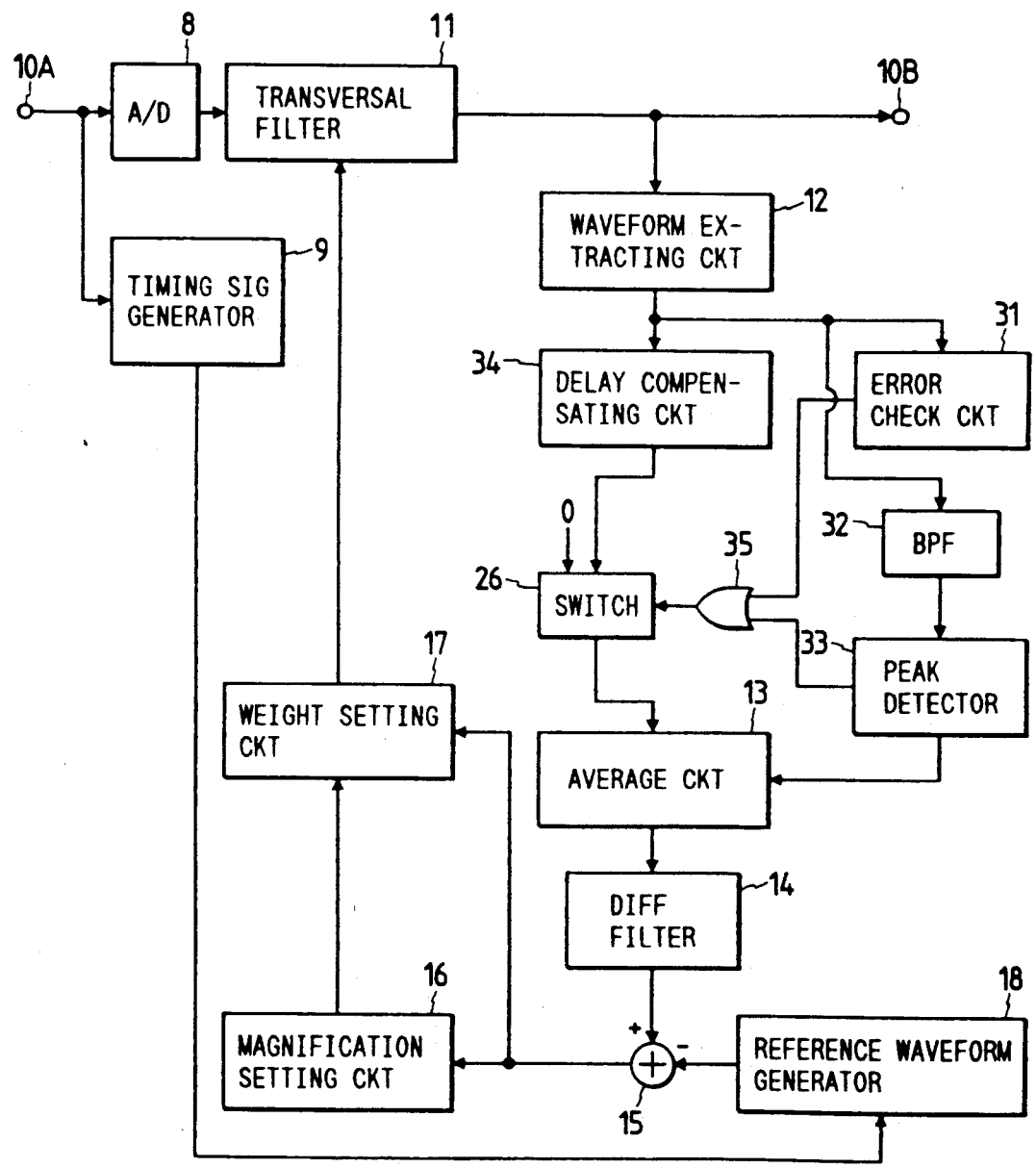
FIG. 1 is a block diagram of a ghost canceler according to a first embodiment of this invention.

With reference to FIG. 1, an analog video signal is fed to an analog-to-digital (A/D) converter 8 and a timing signal generator 9 via an input terminal 10A. The A/D converter 8 converts the analog video signal into a corresponding digital video signal.

The digital video signal is fed from the A/D converter 8 to a transversal digital filter 11. The transversal filter 11 processes the video signal with a filtering characteristic to remove ghost components from the video signal. The filtering characteristic is determined by weights which will be explained later. The weights are also referred to as tap gains. The processed digital video signal is fed from the transversal filter 11 to an input terminal 10B.

The transversal filter 11 includes a suitable combination of an FIR filter and an IIR filter. Specifically, the transversal filter 11 has a cascade combination of delay circuits, weighting circuits multiplying signals from respective taps of the delay-circuit cascade combination by respective weights (tap gains), and an adder summing output signals from the weighting circuits and outputting the resultant sum as a filter output signal. The weights or tap gains which determine the filtering characteristic of the transversal filter 11 are fed from a weight setting circuit 17 as being represented by output weighting data from the weight setting circuit 17.

A waveform extracting circuit 12 receives the output signal from the transversal filter 11. The waveform extracting circuit 12 extracts a waveform of the output signal of the transversal filter 11 which occurs during a predetermined period where a reference signal for ghost cancel is present but display information components are absent. For example, the predetermined waveform-extracting period is one horizontal scanning period in a vertical blanking period. The extraction of the waveform is periodically executed in response to each reference signal extracting pulse fed from the timing signal generator 9.

The output terminal of the waveform extracting circuit 12 is connected to the input terminal of an average circuit 13 via a delay compensating circuit 34 and a switch 26. The switch 26 functions to select one of the output signal from the delay compensating circuit 34 and a "0" signal and transmits the selected signal to the average circuit 13.

As will be made clear hereinafter, a combination of devices 31, 32, 33, and 35 judges whether or not the extracted waveform outputted from the waveform extracting circuit 12 is acceptable. When the extracted waveform is judged to be acceptable, the combination of the device 31, 32, 33, and 35 controls the switch 26 so that the extracted waveform will be transmitted to the average circuit 13 via the delay compensating circuit 34 and the switch 26. When the extracted waveform is judged to be acceptable, the combination of the devices 31, 32, 33, and 35 controls the switch 26 so that the "0" signal will be applied to the average circuit 13. In this way, the acceptable extracted waveform is allowed to enter the average circuit 13 but the unacceptable extracted waveform is inhibited from entering the average circuit 13 and instead the "0" signal is fed to the average circuit 13.

In more detail, the waveform extracting circuit 12 extracts the ghost cancel reference signals from the output video signal from the transversal filter 11. The combination of the devices 31, 32, 33, and 35 serves to determine whether each of the ghost canceler reference signals extracted by the waveform extracting circuit 12 is reliable or unreliable. The switch 26 serves to reject the unreliable ghost cancel reference signals and to accept the reliable ghost cancel reference signals in response to the output signal from the combination of the devices 31, 32, 33, and 35. The unreliable ghost cancel reference signals are defined as causing the setting of wrong tap gains in the transversal filter 11. The reliable ghost cancel reference signals are defined as causing the setting of good tap gains in the transversal filter 11.

The delay compensating circuit 34 functions to compensate a signal delay caused by the signal processing in the circuits 31, 32, and 33.

The average circuit 13 periodically receives the extracted waveform or the "0" signal. The average circuit 13 calculates the average (the simple means value) of a predetermined number of the successively received extracted waveforms and the "0" signals. The average circuit 13 outputs a signal representative of the calculated average to a differentiating filter 14. The differentiating filter 14 differentiates the output signal from the average circuit 13 to prevent an adverse influence of a variation in a dc level in the case where the reference signal takes a step waveform. For example, the differentiating filter 14 is of the type such as [−1,0,1] whose central tap agrees with "0".

A reference waveform generator 18 determines an original reference waveform in advance and outputs a signal representing the original reference waveform. For example, the original reference waveform agrees with a differential of a bar waveform of a GCR signal. The GCR signal is transmitted from a TV broadcasting station as a part of a color television signal, and the details of the GCR signal are described in Japanese Magazine "Nikkei Electronics", 1989 8.7 (No. 479), page 121.

The timing signal generator 9 generates various timing signals on the basis of the horizontal sync signal, the vertical sync signal, or another sync signal in the analog video signal. The timing signal generator 9 feeds one of the timing signals to the reference waveform generator 18. The reference waveform generator 18 outputs the signal of the original reference waveform at a timing determined by the timing signal fed from the timing signal generator 9.

A subtracter 15 calculates the difference between the output signals from the differentiating filter 14 and the reference waveform generator 18 and outputs an error signal representing the difference between the output signals from the differentiating filter 14 and the reference waveform generator 18. The signal outputted from the reference waveform generator 18 to the subtracter 15 is synchronized with the output signal from the differentiating filter 14 to the subtracter 15 by the operation of the timing signal fed to the reference waveform generator 18.

A magnification setting circuit 16 receives the error signal from the subtracter 15. The magnification setting circuit 16 sets a magnification in accordance with the error signal. The weight setting circuit 17 receives the error signal from the subtracter 15. The weight setting circuit 17 receives an output signal from the magnification setting circuit 16 which represents the magnification. The weight setting circuit 17 determines tap gains in accordance with the error signal and the magnification and outputs a signal representative of the determined tap to the transversal filter 11.

Figure 2:
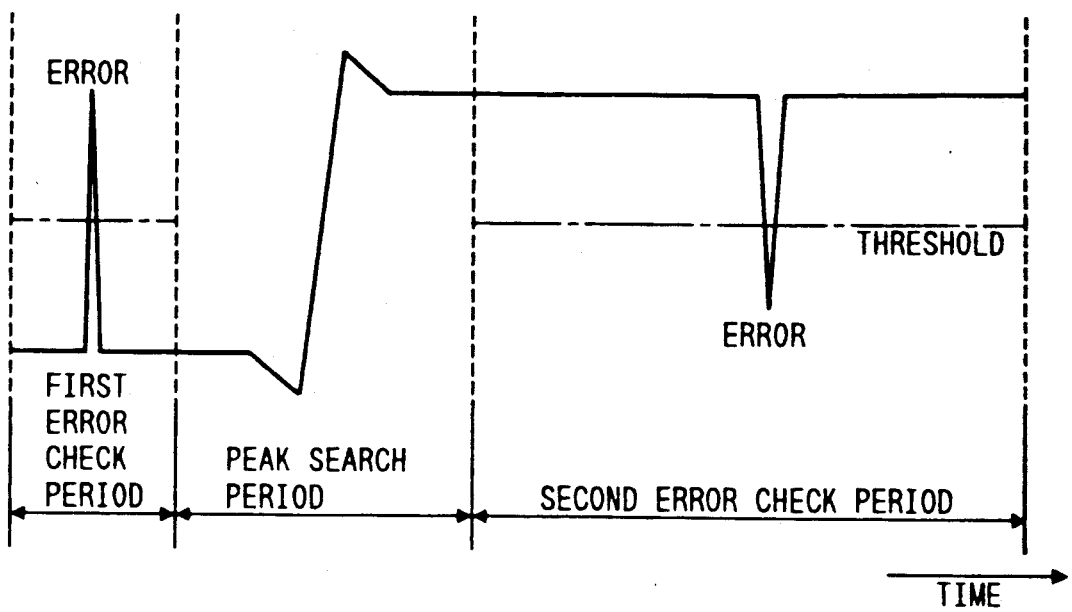
FIG. 2 is a diagram showing the waveform of an extracted ghost cancel reference signal in the ghost canceler of FIG. 1.

The extracted waveform is fed from the waveform extracting circuit 12 to the error check circuit 31. In FIG. 2, an example of the extracted waveform with error signals is shown. As shown in FIG. 2, a first error check period is predetermined in a head part to the waveform extracting period. During the first error check period, the error check circuit 31 compares the value of the extracted waveform with a predetermined threshold level and detects the value of the extracted waveform which is greater than the threshold level. When the error check circuit 31 does not detect the value of the extracted waveform which is greater than the threshold level, the error check circuit 31 outputs an OK signal to the switch 26 via the OR gate 35 so that the switch 26 can feed the output signal from the delay compensating circuit 34 to the average circuit 13. When the error check circuit 31 detects the value of the extracted waveform which is greater than the threshold level, the error check circuit 31 outputs an NG signal to the switch 26 via the OR gate 35 so that the switch 26 will feed the "0" signal to the average circuit 13. For example, the threshold level is chosen to agree with about a half of the height of a step of the reference signal.

The extracted waveform is fed from the waveform extracting circuit 12 to the peak detector 33 via the band pass filter 32. The band pass filter 32 functions to prevent ghosts and noises from adversely affecting a peak detecting process executed by the peak detector 33. As shown in FIG. 2, a predetermined peak search period follows the first error check period. During the peak search period, the peak detector 33 detects a peak of the extracted waveform which is higher than a reference level. When the peak detector 33 detects a peak of the extracted waveform which is higher than the reference level, the peak detector 33 outputs an OK signal to the switch 26 via the OR gate 35 so that the switch 26 can feed the output signal from the delay compensating circuit 34 to the average circuit 13. When the peak detector 33 does not detect a peak of the extracted waveform which is higher than the reference level, the peak detector 33 outputs an NG signal to the switch 26 via the OR gate 35 so that the switch 26 will feed the "0" signal to the average circuit 13. For example, the reference level is chosen to agree with about a half of the amplitude of a differential of the original reference signal. In addition, the peak detector 33 output a signal representative of a position of the peak to the average circuit 13.

As shown in FIG. 2, a predetermined second error check period follows the peak search period. During the second error check period, the error check circuit 31 compares the value of the extracted waveform with the threshold level and detects the value of the extracted waveform which is smaller than the threshold level. When the error check circuit 31 does not detect the value of the extracted waveform which is smaller than the threshold level, the error check circuit 31 outputs the OK signal to the switch 26 via the OR gate 35 so that the switch 26 can feed the output signal from the delay compensating circuit 34 to the average circuit 13. When the error check circuit 31 detects the value of the extracted waveform which is smaller than the threshold level, the error check circuit 31 outputs NG signal to the switch 26 via the OR gate 35 so that the switch 26 will feed the "0" signal to the average circuit 13.

The combination of the devices 31, 32, 33, and 35 detects the extracted waveform which is contaminated by an error. When such an erroneous waveform is detected, the combination of the devices 31, 32, 33, and 35 controls the switch 26 so that the erroneous waveform will be inhibited from entering the average circuit 13. Therefore, the ghost cancel operation is protected from such an error.

As described previously, the average circuit 13 calculated the average of a predetermined number of the successively received extracted waveforms and the "0" signals. In practice, the timing signal is accompanied with jitter. This fact makes the averaging calculation inaccurate. To avoid such an undesirable effect, during the summing calculation, the average circuit 13 shifts the extracted waveforms in response to the output signal from the peak detector 33 so that the positions of the respective peaks of the extracted waveforms will be aligned. Jitters of the waveform extracting pulses would cause uneven positions of the respective peaks of the extracted waveforms which are compensated by shifting the extracted waveforms in responsive to the output signal from the peak detector 33. Therefore, the ghost cancel operation is protected from such a jitter.

The average circuit 13 includes a position shifter, a storage section, an adding section, and a divider. The position shifter shifts the position of the extracted waveform or the "0" signal relative to the horizontal line in accordance with the output signal from the peak detector 33. For example, the position shifter is composed of a delay circuit delaying the extracted waveform or the "0" signal in accordance with the output signal from the peak detector 33. The output signal from the position shifter is stored into the storage section. A predetermined number of the successively-generated extracted waveforms and the "0" signals are read out from the storage section and are added by the adding section. The divider divides the output signal from the adding section by the predetermined number to calculate the average.

Figure 3:
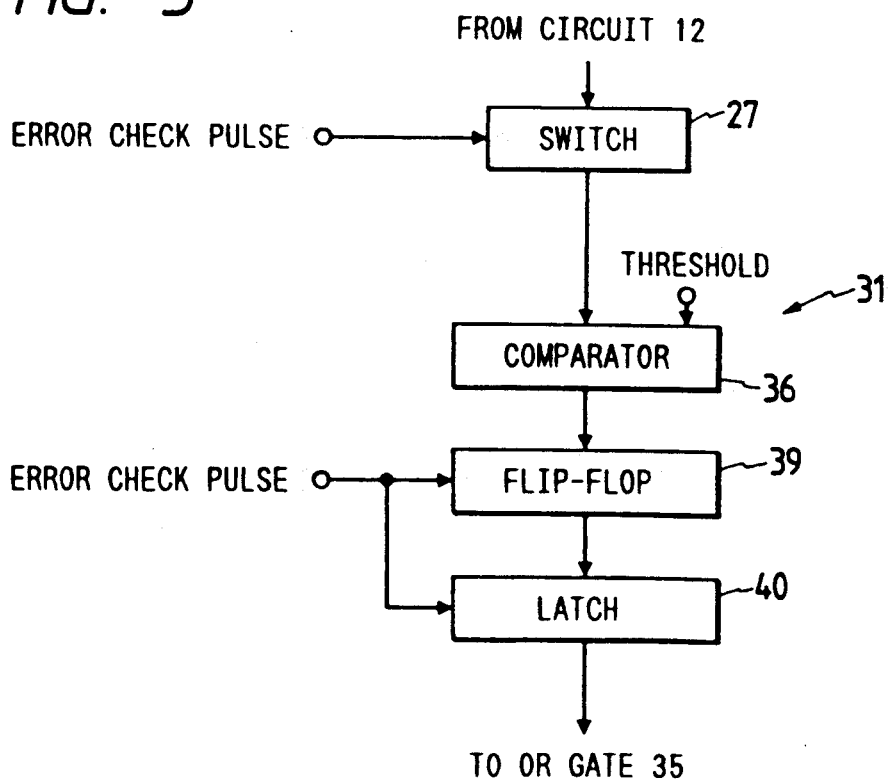
FIG. 3 is a block diagram of the error check circuit of FIG. 1.

As shown in FIG. 3, the error check circuit 31 includes a switch 27, a comparator 36, a flip-flop 39, and a latch 40. During the first error check period, the switch 27 is closed by a gate pulse representative of the first error check period so that the output signal from the waveform extracting circuit 12 is transmitted to the comparator 36. The gate pulse is fed from the timing signal generator 9. The comparator 36 compares the value of the output signal from the waveform extracting circuit 12 with the threshold level. When the value of the output signal from the waveform extracting circuit 12 is greater than the threshold level, the comparator 36 sets the flip-flop 39. while the value of the output signal from the waveform extracting circuit 12 remains not greater than the threshold level, the flip-flop 39 continues to be reset.

During the second error check period, the switch 27 is closed by a gate pulse representative of the second error check period so that the output signal from the waveform extracting circuit 12 is transmitted to the comparator 36. The gate pulse is fed from the timing signal generator 9. The comparator 36 compares the value of the output signal from the waveform extracting circuit 12 with the threshold level. The comparator 36 is changed in polarity by the gate pulse. When the value of the output signal from the waveform extracting circuit 12 is smaller than the threshold level, the comparator 36 sets the flip-flop 39. While the value of the output signal from the waveform extracting circuit 12 remains not smaller than the threshold level, the flip-flop 39 continues to be reset.

The output signal from the flip-flop 39 is latched by the latch 40 at a timing determined by the trailing edge of the gate pulse of the second error check period. In addition, the flip-flop 39 is reset in response to the trailing edge of the gate pulse of the second error check period. The output signal from the latch 40 is fed to the OR gate 35 as the OK signal or the NG signal.

Figure 4:
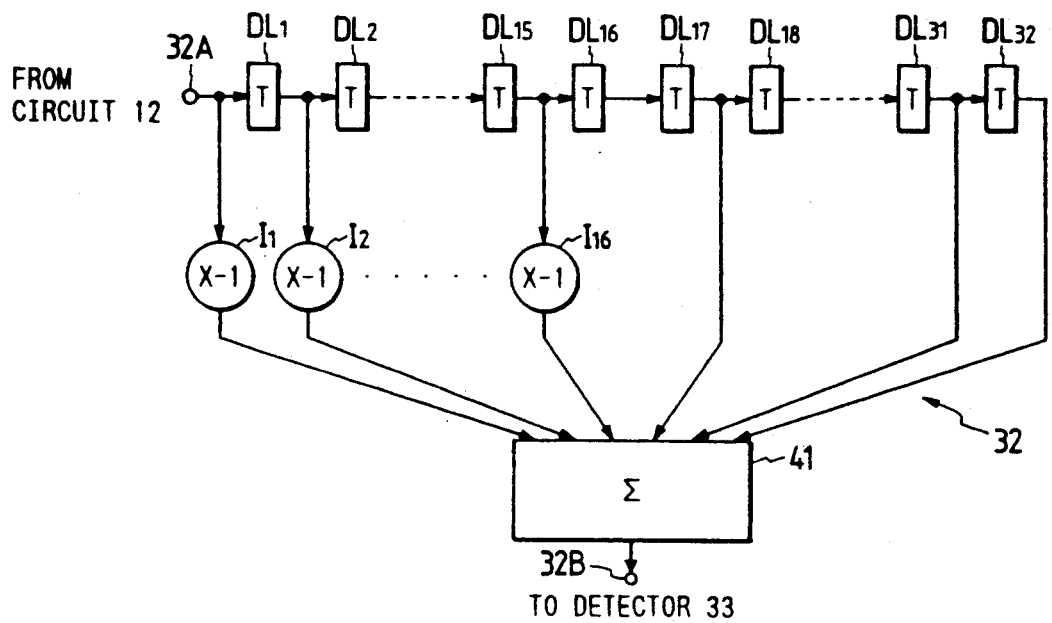
FIG. 4 is a block diagram of the band pass filter of FIG. 1.

As shown in FIG. 4, the band pass filter 32 has an input terminal 32A and an output terminal 32B connected to the waveform extracting circuit 12 and the peak detector 33 respectively. The band pass filter 32 has a cascade combination of unit delay elements DL1-DL32 which leads from the input terminal 32A. The cascade combination of the delay elements DL1-DL32 has a central tap and other taps grouped into a first half and a second half. The central tap has no connection with an adder 41. The taps in the first half are connected to the adder 41 via respective polarity inverters I1-I16. The taps in the second half are directly connected to the adder 41. The adder 41 sums the outputs signals from the inverters I1-I16 and the output signals from the taps in the second half. The adder 41 outputs a signal of the resultant sum to the output terminal 32B.

Figure 5:
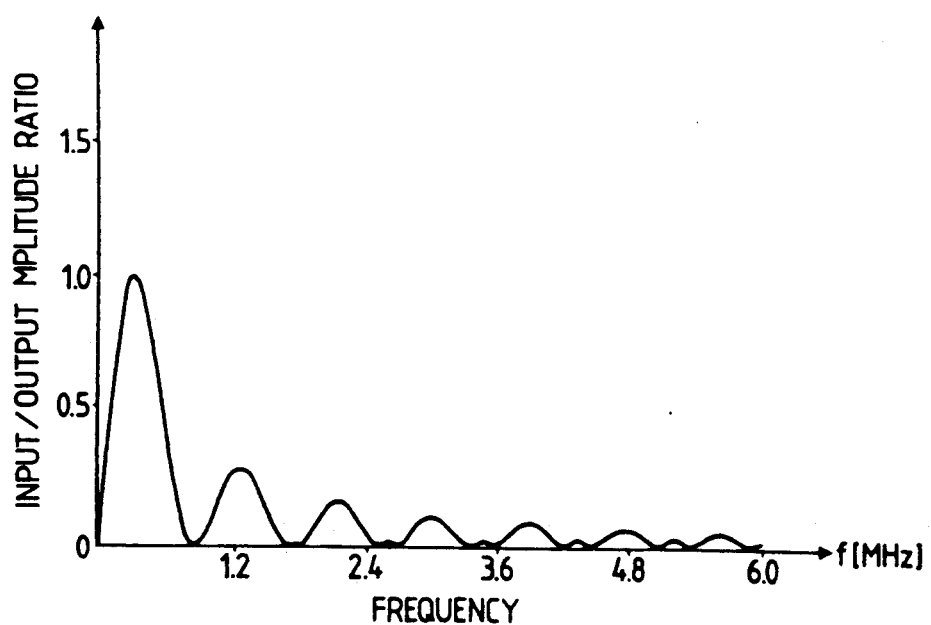
FIG. 5 is a diagram showing a frequency response characteristic of the band pass filter of FIGS. 1 and 4.

The band pass filter 32 is composed of a transversal digital filter whose tap gains are chosen as $[-1,-1,\ldots,-1,0,1,\ldots,1,1]$. As shown in FIG. 5, the band pass filter 32 passes low frequency bands but rejects high frequency bands so that noise and ghost components can be effectively removed. In FIG. 5, the ordinate (vertical axis) denotes a ratio between an amplitude of an input to the band pass filter 32 and an amplitude of an output from the band pass filter 32, and the ratio is illustrated in such a unit that the maximum of the ratio is normalized to a value of 1.0.

Figure 6:
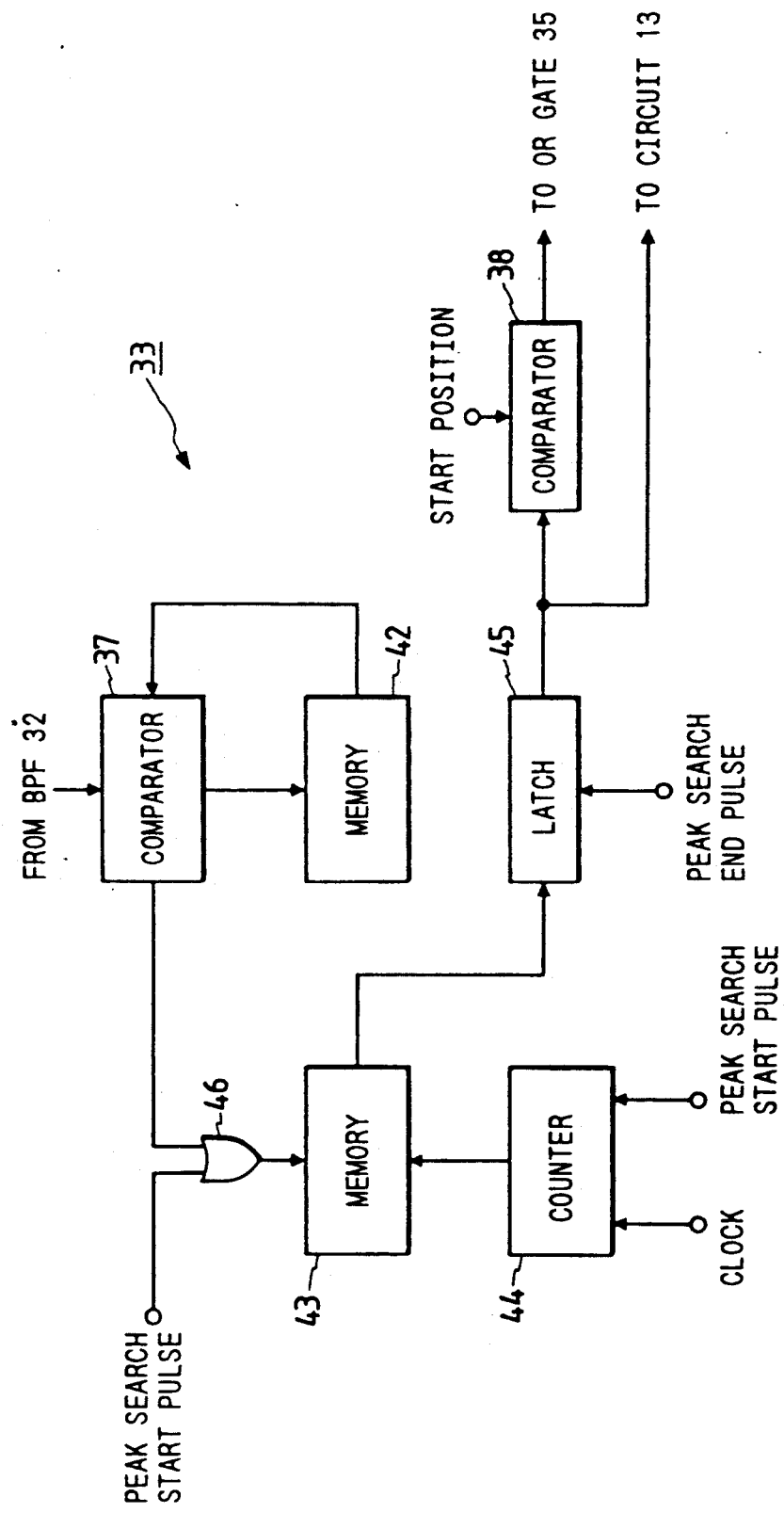
FIG. 6 is a block diagram of the peak detector of FIG. 1.

As shown in FIG. 6, the peak detector 33 includes a comparator 37 which compares the output signal from the band pass filter 32 with a maximal signal fed from a memory 42. The maximal signal is periodically initialized to a threshold level at a timing determined by the leading edge of a pulse representing each peak search period. The comparator selects a greater of the output signal from the band pass filter 32 and the maximal signal and stores the selected signal into the memory 42 as a new maximal signal. When the maximal signal is replaced by a greater new maximal signal in the memory 42, that is, when a peak is detected, the comparator 37 outputs a write signal to a memory 43. Upon the receipt of the write signal, the memory 43 holds an output signal from a counter 44 which represents a position of the peak.

The counter 44 is reset by the leading edge of the pulse of the peak search period and counts pulses of a clock signal so that the output signal from the counter 44 will represent the position of the segment of the signal currently processed by the comparator 37.

The leading edge of the pulse of the peak search period is fed to the memory 43 via the OR gate 46 as a write signal. Accordingly, the signal stored in the memory 43 is periodically initialized in response to a leading edge of each pulse of the peak search period. During each peak search period, the signal stored in the memory 43 remains in the initial state when a peak detected by the comparator 37 is absent, and the signal stored in the memory 43 is replaced by the peak position signal when a peak detected by the comparator 37 is present.

The output signal from the memory 43 is latched by a latch 45 in response to the trailing edge of each pulse of the peak search period. The output signal from the latch 45 is fed to the average circuit 13 as a peak position signal. A comparator 38 compares the output signal from the latch 45 with a predetermined signal equal to the initial state of the signal in the memory 43. When the output signal from the latch 45 and the predetermined signal are equal to each other, the comparator 38 outputs an NG signal to the OR gate 35. When the output signal from the latch 45 and the predetermined signal are different from each other, the comparator 38 outputs an OK signal to the OR gate 35.

The embodiment of FIGS. 1-6 will be further described with reference to FIGS. 11-15.

Figure 11:
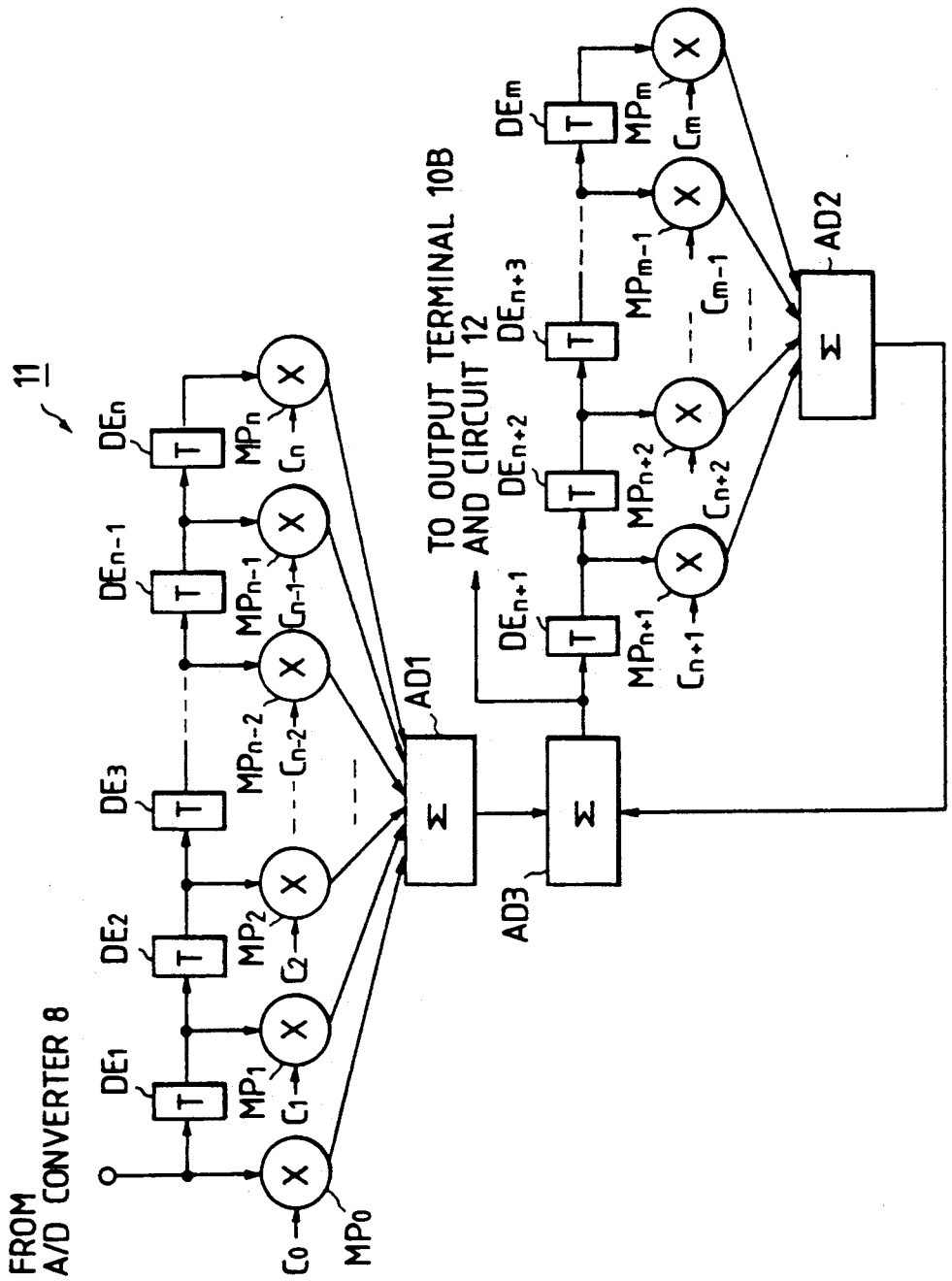
FIG. 11 is a block diagram of the transversal filter of FIG. 1.

As shown in FIG. 11, the transversal filter 11 includes a cascade combination of unit delay elements DE1, DE2, ..., DEn, a cascade combination of unit delay elements DEn+1, DEn+2, ..., DEm, multipliers MP0, MP1, ..., MPm, and adders AD1, AD2, and AD3. The input terminal of the delay element DE1 receives the output signal from the A/D converter 8. A first input terminal of the multiplier MP0 receives the output signal from the A/D converter 8. First input terminals of the multipliers MP1, MP1, ..., MPm receive the output signals from the delay elements DE1, DE2, ..., DEm respectively. Second input terminals of the multipliers MP0, MP1, ..., MPm receive the output weighting data from the weight setting circuit 17 which present weighting coefficients (tap gains or weights) C0, C1, ..., and Cm respectively. It should be note that weighting coefficients are also referred to as tap gains. The multiplier MP0 multiplies the output signal from the A/D converter 8 and the weighting coefficient C0. The multipliers MP1, MP2, ..., MPm multiply the output signals from the delay elements DE1, DE2, ..., DEm and the weighting coefficients C1, C2, ..., Cm respectively. The output signals from the multipliers MP0, MP1, ..., MPn are added by the adder AD1. The output signals from the multipliers MPn+1, MPn+2, ..., MPm are added by the adder AD2. The output signals from the adders AD1 and AD2 are added by the adder AD3. The output signal from the adder AD3 is fed to the input terminal of the delay element DEn+1. In addition, the output signal from the adder AD3 is fed to the output terminal 10B and the waveform extracting circuit 12 as an output signal from the transversal filter 11.

Figure 12:
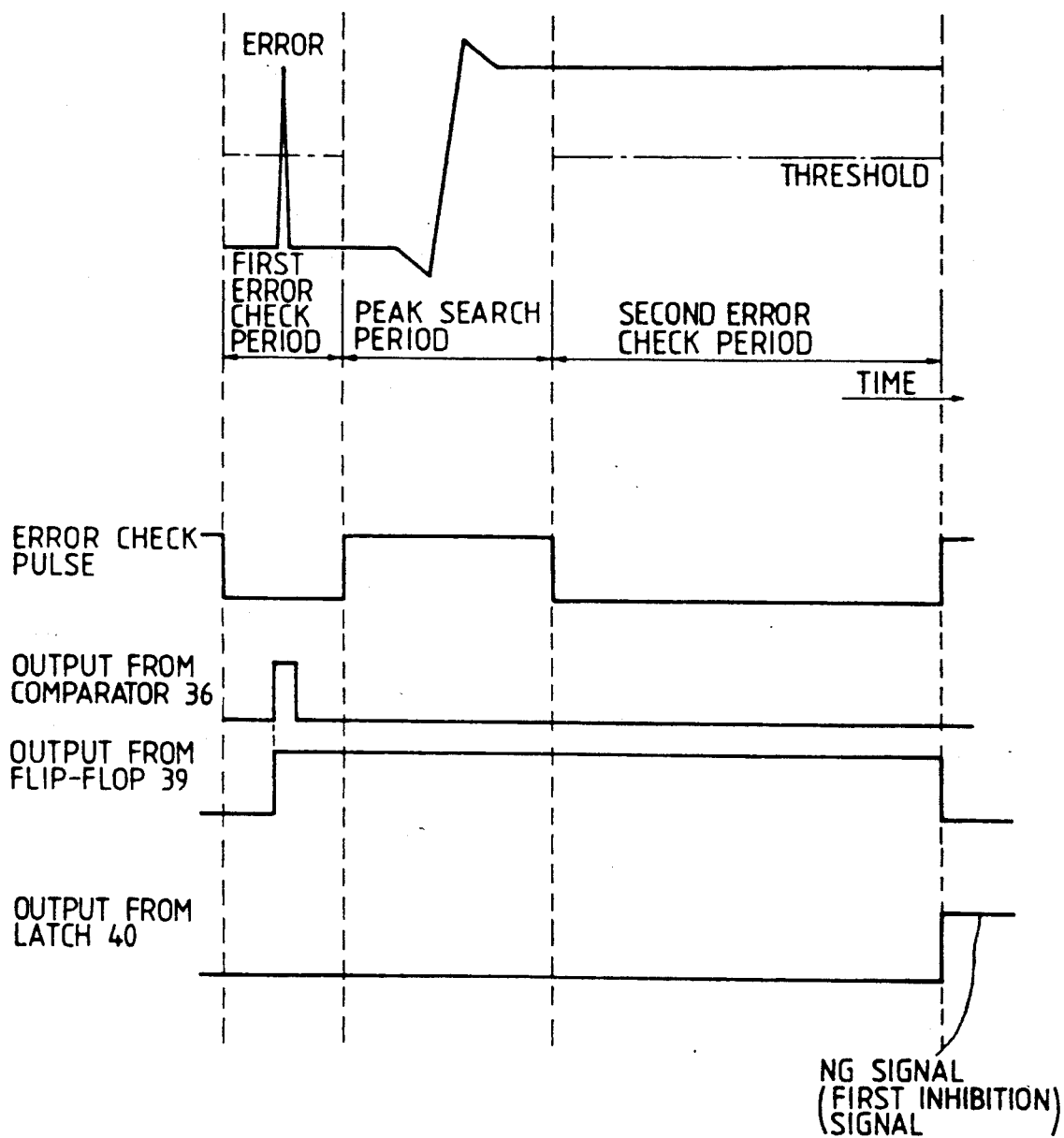
FIGS. 12-15 are timing diagrams showing various signals in the ghost canceler of FIG. 1.

The NG signal outputted from the error check circuit 31 to the OR gate 35 is a first inhibition signal. The first inhibition signal and also the operations of the internal devices of the error check circuit 31 will now be described with reference to FIG. 12. It is now assumed that, as shown in FIG. 12, an error occurs during the first error check period. During the first error check period, the error check pulse applied to the switch 27 is in the low-level state, and the switch 27 is closed by the error check pulse. The output signal from the comparator 36 changes from the low-level state to the high-level state in response to the occurrence of the error. This change of the state of the output signal from the comparator 36 sets the flip-flop 39, so that the output signal from the flip-flop 39 changes from the low-level state to the high-level state. At the end of the second error check period, the error check pulse applied to the latch 40 changes from the low-level state to the high-level state, so that the high-level output signal from the flip-flop 39 is latched by the latch 40. As a result, the latch 40 outputs a high-level signal which is an NG signal, that is, a first inhibition signal. It should be noted that, in the conditions shown by FIG. 12, the latch 40 outputs a low-level signal (an OK signal) before outputting the NG signal.

Figure 13:
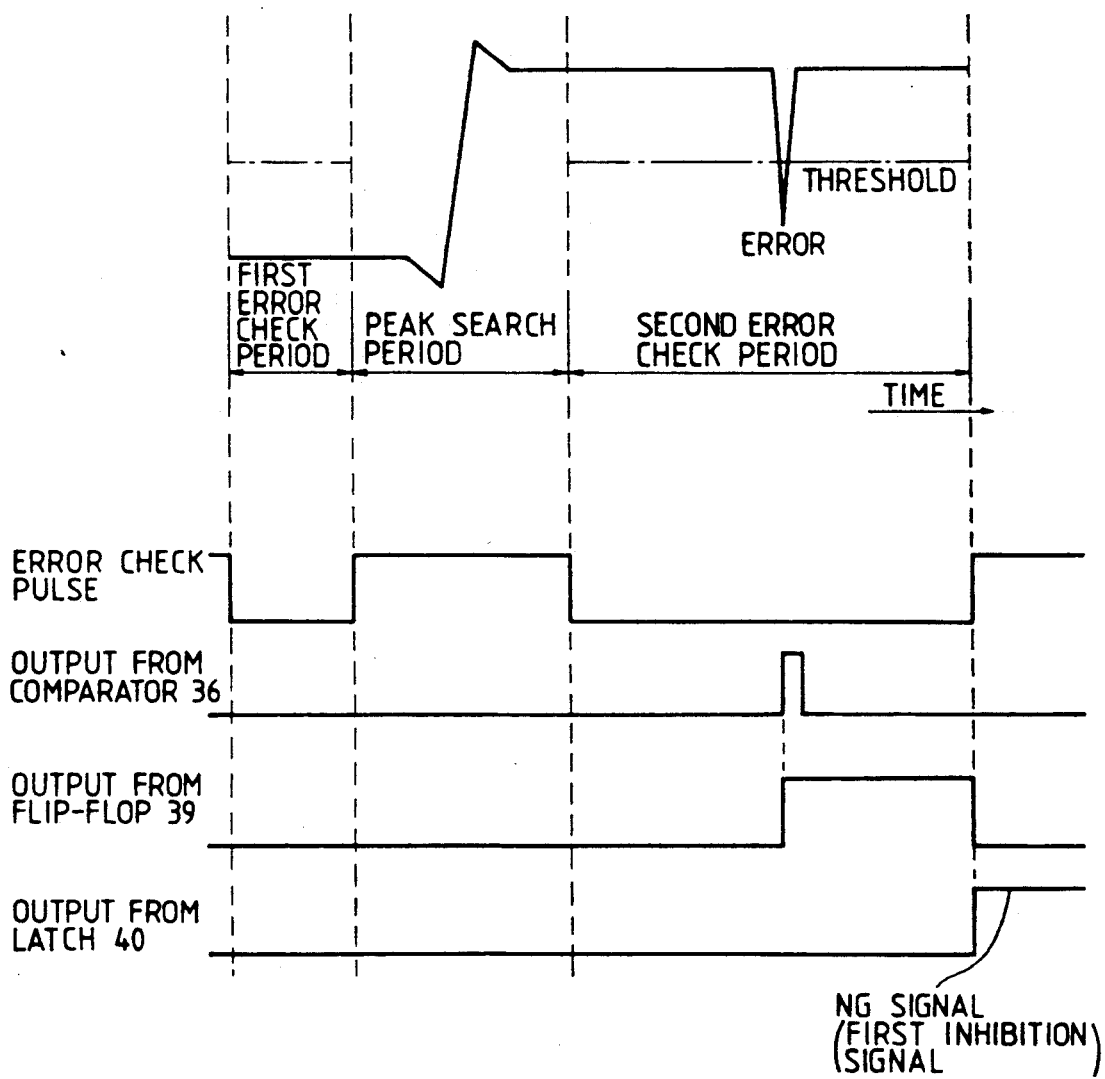

The first inhibition signal and also the operations of the internal devices of the error check circuit 31 will now be further described with reference to FIG. 13. It is now assumed that, as shown in FIG. 13, an error occurs during the second error check period. During the second error check period, the error check pulse applied to the switch 27 is in the low-level state, and the switch 27 is closed by the error check pulse. The output signal from the comparator 36 changes from the low-level state to the high-level state in response to the occurrence of the error. This change of the state of the output signal from the comparator 36 sets the flip-flop 39, so that the output signal from the flip-flop 39 changes from the low-level state to the high-level state. At the end of the second error check period, the error check pulse applied to the latch 40 changes from the low-level state to the high-level state, so that the high-level output signal from the flip-flop 39 is latched by the latch 40. As a result, the latch 40 outputs a high-level signal which is an NG signal, that is, a first inhibition signal. It should be noted that, in the conditions shown by FIG. 13, the latch 40 outputs a low-level signal (an OK signal) before outputting the NG signal.

Figure 14:
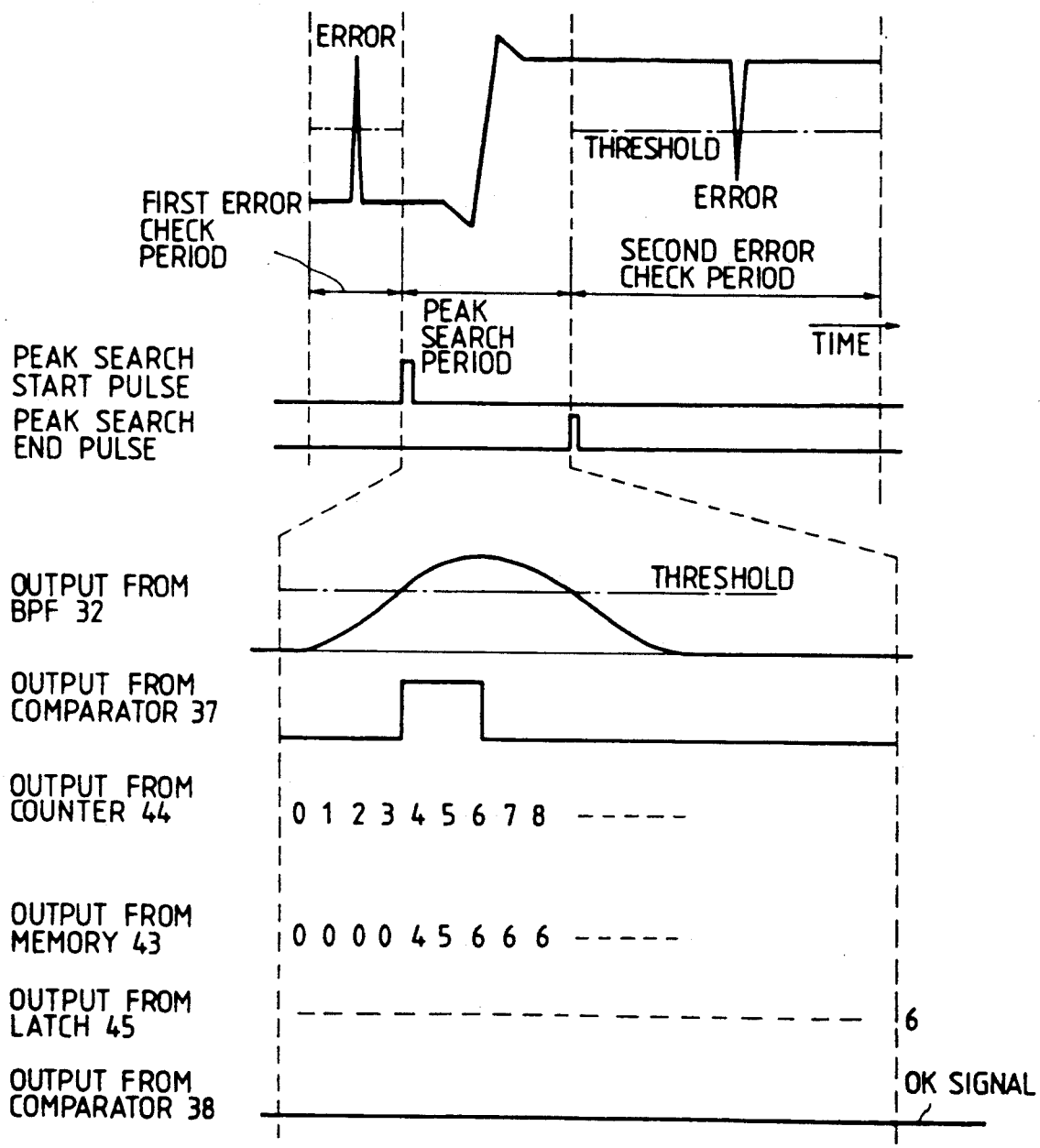

The NG signal outputted from the peak detector 33 to the OR gate 35 is a second inhibition signal. For a better understanding of the second inhibition signal, a description will now be given of the operations of the internal devices of the peak detector 33 and also the OK signal outputted from the peak detector 33 to the OR gate 35 with reference to FIG. 14. It should be noted that the lower part of FIG. 14 is expanded in time scale relative to the time scale of the upper part of FIG. 14. It is now assumed that, as shown in FIG. 14, a suitable peak is present during the peak search period which is defined between the leading edges of the peak search start pulse and the peak search end pulse. During a part of the peak search period, the output signal from the band pass filter 32 exceeds a threshold which agrees with the maximal signal fed from the memory 42 so that the comparator 37 outputs a high-level signal. The end of the high-level output signal from the comparator 37 corresponds to the time position of the peak. While the high-level outputs signal from the comparator 37 remains present, the output signal from the memory 43 changes in agreement with the output signal from the counter 44. After the end of the high-level output signal from the comparator 37, the output signal from the memory 43 remains at the value which occurs at the end of the high-level output signal from the comparator 37. At the end of the peak search period, the output signal from the memory 43 is latched by the latch 45. The comparator 38 compares the output signal from the latch 45 with the predetermined signal equal to the initial state of the signal in the memory 43. In the case of a suitable peak, the output signal from the latch 45 and the predetermined signal are different from each other so that the comparator 38 outputs a low-level signal which is an OK signal. It should be noted that, in the conditions shown by FIG. 13, the latch 45 also outputs a low-level signal (an OK signal) during the preceding operation cycle.

Figure 15:
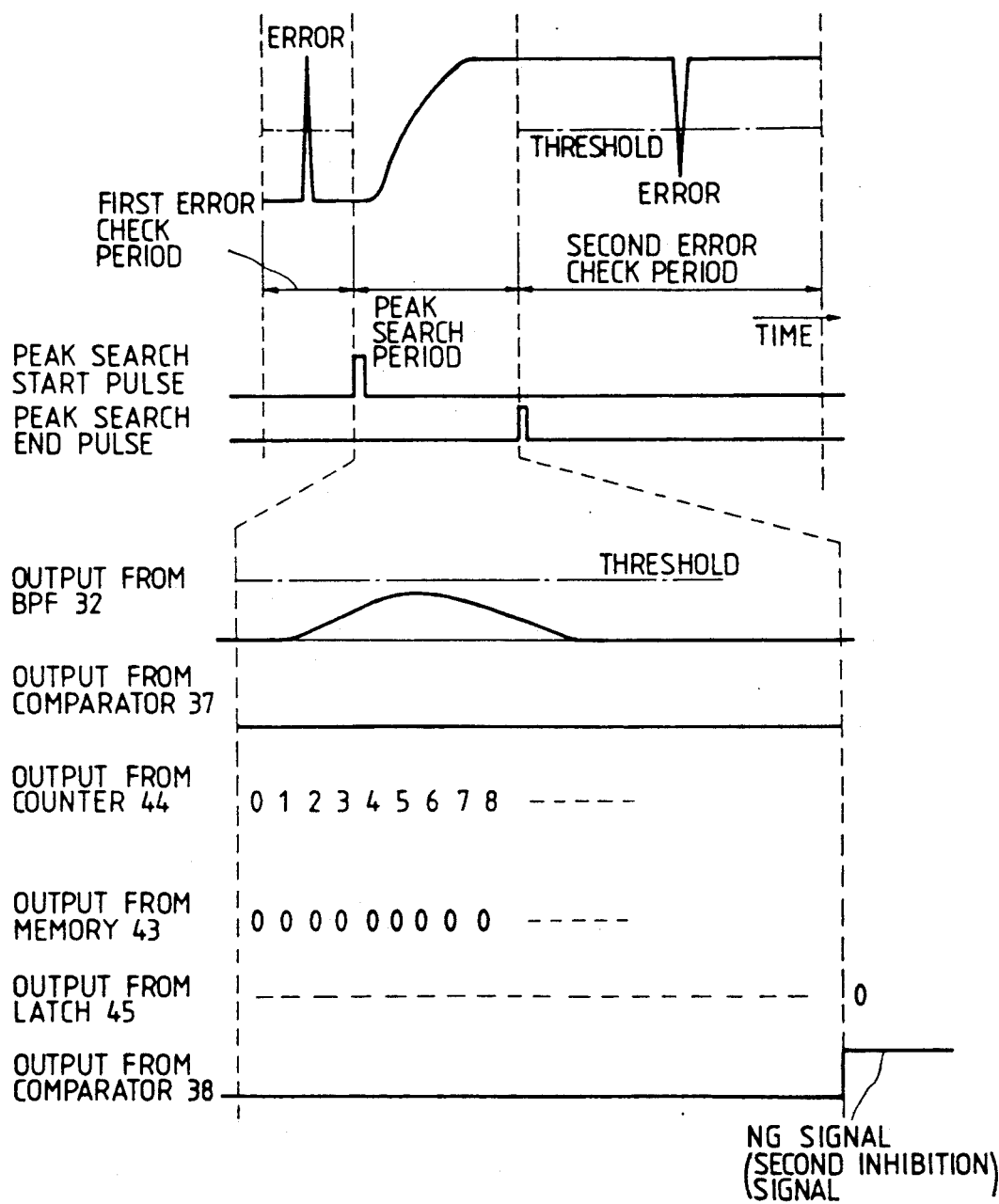

A description will now be given of the operations of the internal devices of the peak detector 33 and also the NG signal outputted from the peak detector 33 to the OR gate 35 with reference to FIG. 15. It should be noted that the lower part of FIG. 15 is expanded in time scale relative to the time scale of the upper part of FIG. 15. It is now assumed that, as shown in FIG. 15, a suitable peak is absent from the peak search period which is defined between the leading edges of the peak search start pulse and the peak search end pulse. During the peak search period, the output signal from the band pass filter 32 remains lower than the threshold which agrees with the maximal signal fed from the memory 42 so that the comparator 37 continues to outputs a low-level signal. As a result, the output signal from the memory 43 remains at "0" independent of the output signal from the counter 44. At the end of the peak search period, the output signal "0" from the memory 43 is latched by the latch 45. The comparator 38 compares the output signal from the latch 45 with the predetermined signal equal to the initial state of the signal in the memory 43. The predetermined signal is generally equal to "0". In the absence of a suitable peak, the output signal from the latch 45 and the predetermined signal are equal to each other so that the comparator 38 outputs a high-level signal which is an NG signal, that is, a second inhibition signal. It should be noted that, in the conditions shown by FIG. 13, the latch 45 outputs a low-level signal (an OK signal) before outputting the NG signal.

DESCRIPTION OF THE SECOND PREFERRED EMBODIMENT

Figure 7:
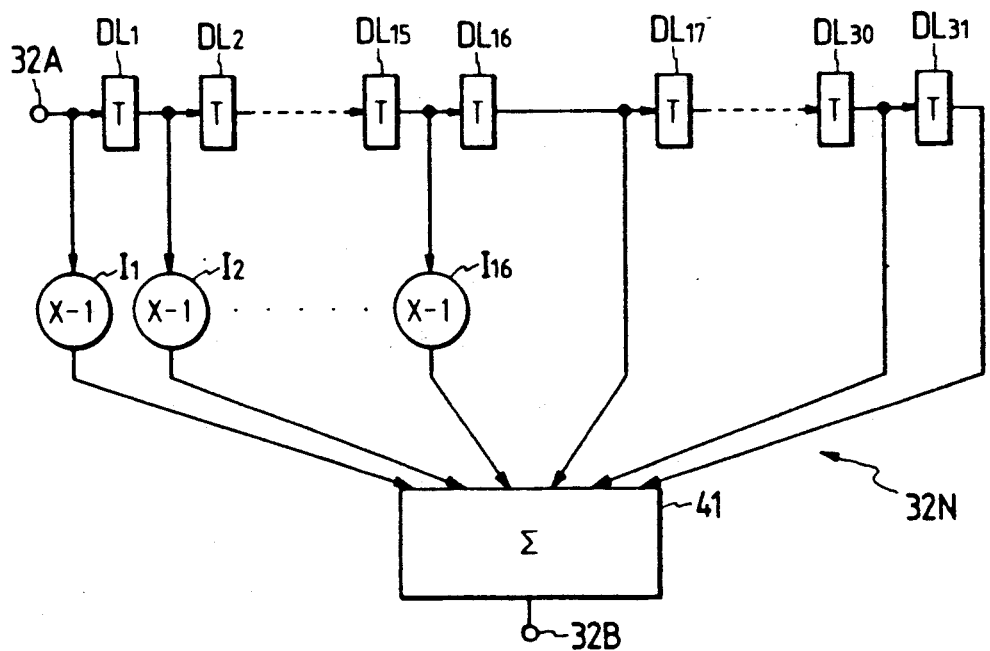
FIG. 7 is a block diagram of a band pass filter in a second embodiment of this invention.

A second embodiment of this invention is similar to the embodiment of FIGS. 1–6 except that a band pass filter is modified. Since an internal design of a band pass filter of the second embodiment differs from the internal design of the band pass filter 32 of the embodiment of FIGS. 1–6, the band pass filter of the second embodiment will be denoted by the reference character "32N" in place of the reference character "32". FIG. 7 shows the band pass filter 32N in second embodiment.

As shown in FIG. 7, the band pass filter 32N has an input terminal 32A and an output terminal 32B connected to the waveform extracting circuit 12 and the peak detector 33 respectively. The band pass filter 32N has a cascade combination of unit delay elements DL1–DL31 which leads from the input terminal 32A. The cascade combination of the delay elements DL1–DL31 has taps grouped into a first half and a second half. The taps in the first half are connected to an adder 41 via respective polarity inverters I1–I16. The taps in the second half are directly connected to the adder 41. The adder 41 sums the outputs signals from the inverters I1–I16 and the output signals from the taps in the second half. The adder 41 outputs a signal of the resultant sum to the output terminal 32B.

Figure 8:
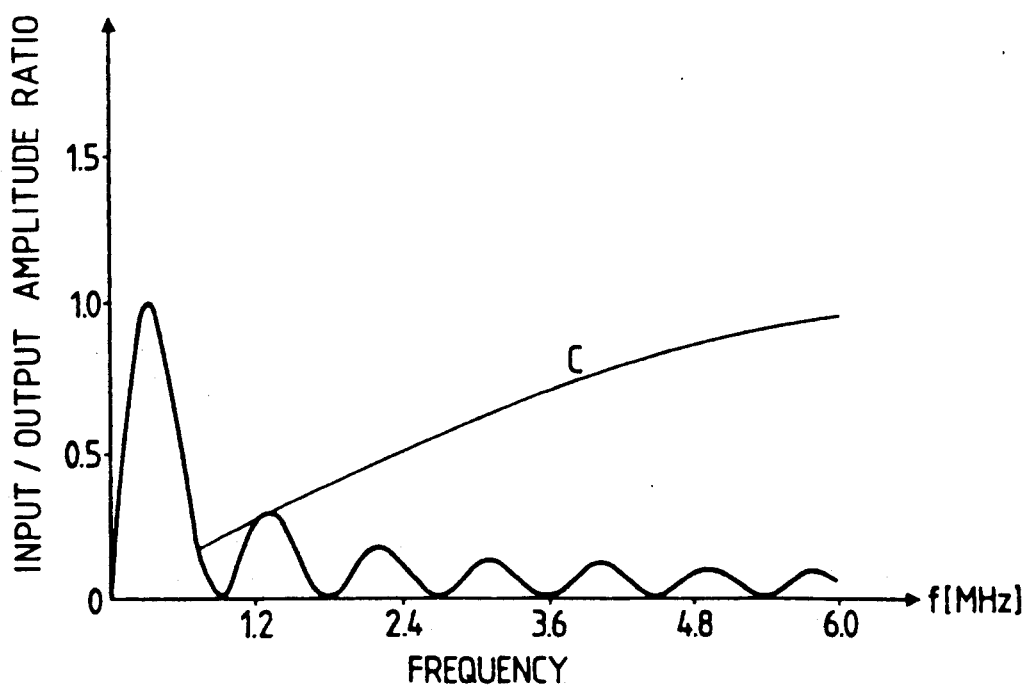
FIG. 8 is a diagram showing a frequency response characteristic of the band pass filter of FIG. 7.

The band pass filter 32N is composed of a transversal digital filter whose tap gains are chosen as $[-1,-1,...,-1,1,...,1,1]$. As shown in FIG. 8, the band pass filter 32N passes low frequency bands but rejects high frequency bands so that noise and ghost components can be effectively removed. In FIG. 8, the ordinate (vertical axis) denotes a ratio between an amplitude of an input to the band pass filter 32N and an amplitude of an output from the band pass filter 32N, and the ratio is illustrated in such a unit that the maximum of the ratio is normalized to a value of 1.0.

DESCRIPTION OF THE THIRD PREFERRED EMBODIMENT

Figure 9A:
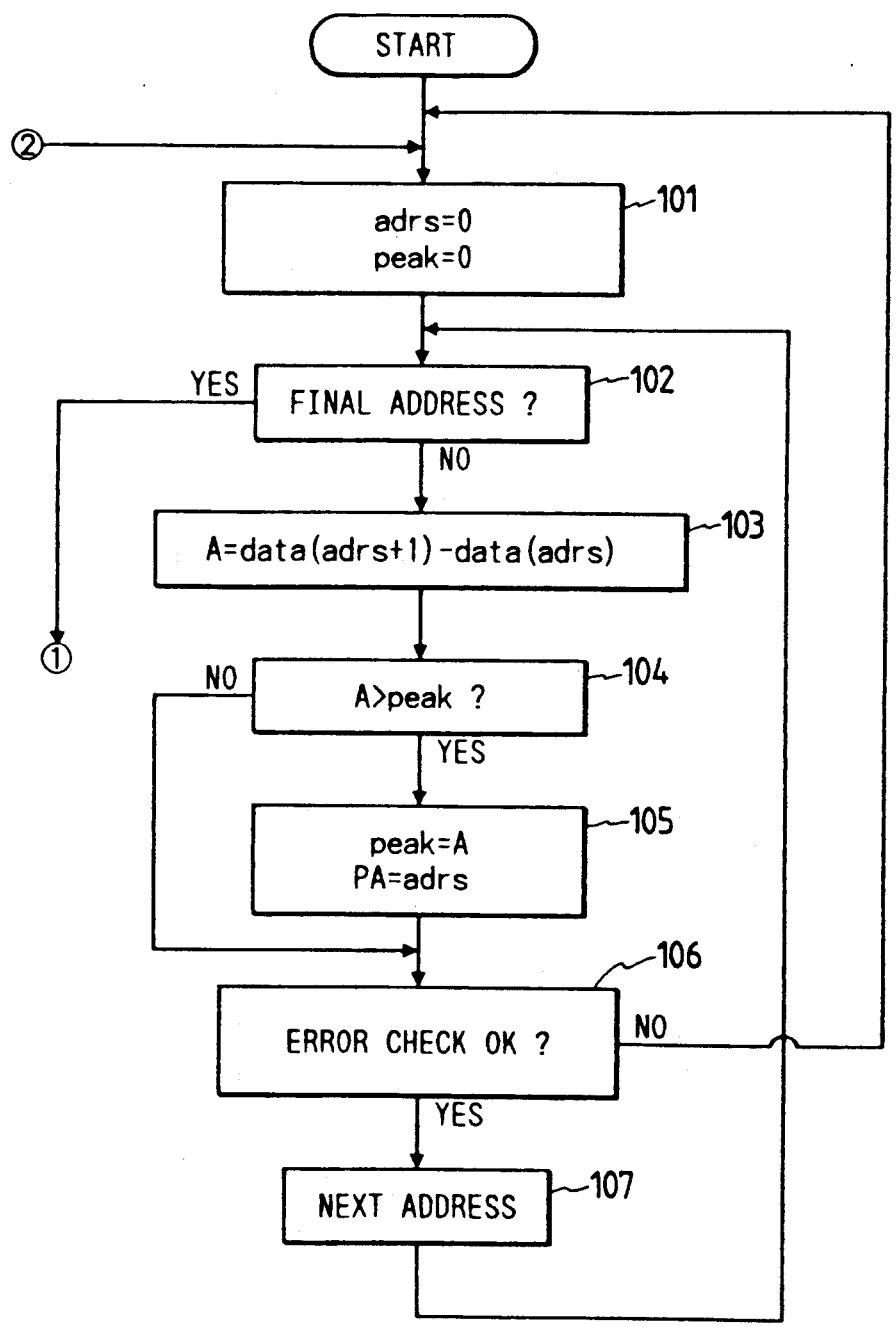
FIGS. 9(A) and 9(B) are a flowchart of a program operating a microcomputer in a third embodiment of this invention.
Figure 9B:
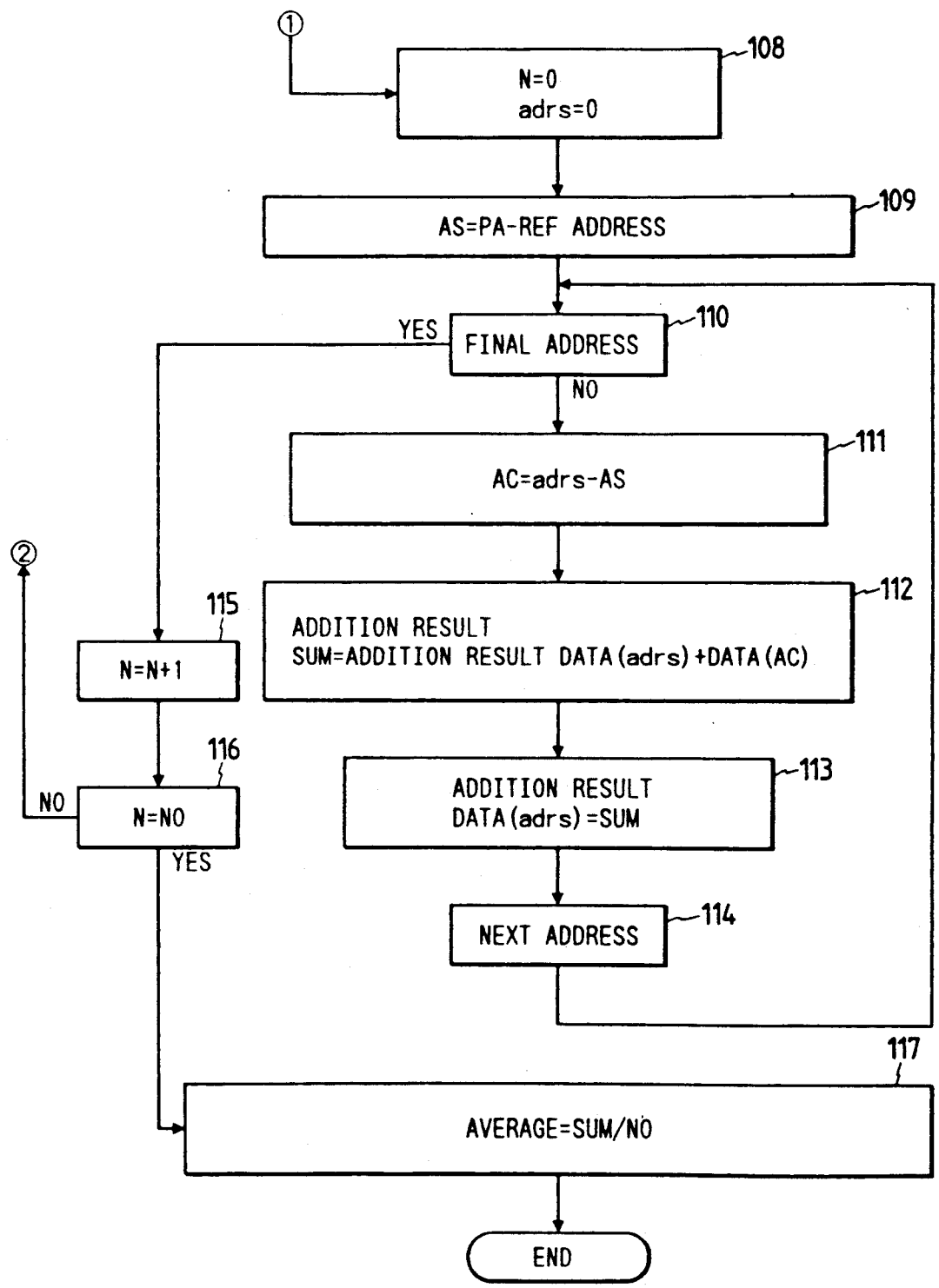

A third embodiment of this invention is similar to the embodiment of FIGS. 1–6 except for design changes indicated hereinafter. In the third embodiment, the peak detector 33 and the average circuit 13 are composed of a microcomputer (or a digital signal processor) which has a combination of a CPU, a ROM, and a RAM. In the microcomputer, the extracted waveform is represented by data of successive pixels in each horizontal line. The positions of the pixels relative to the horizontal line are represented by successive addresses respectively. The microcomputer operates in accordance with a program stored in the ROM. FIGS. 9(A) and 9(B) are a flowchart of the program. The program is started in synchronism with the horizontal sync signal.

A first step 101 of the program initializes various variables, such as "adrs" and "peak", to 0. The variable "adrs" denotes an address representing the position of currently-processed data relative to a horizontal line. After the step 101, the program advances to a step 102. The step 102 checks whether or not the current address "adrs" is equal to the final address corresponding to the rear end pixel of the horizontal line. When the current address "adrs" is not equal to the final address, the program advances to a step 103. When the current address "adrs" is equal to the final address, the program jumps to a step 108.

The step calculates a value A which equals the data of the subsequent address minus the data of the current address. A step 104 following the step 103 checks whether or not the value A is greater than the value "peak". When the value A is greater than the value "peak", the program advances to a step 105. When the value A is not greater than the value "peak", the program jumps to a step 106.

The step 105 sets the value "peak" equal to the value A. In addition, the step 105 set the value PA equal to the current address "adrs". The value PA will finally represent the position of the peak relative to the horizontal line. After the step 105, the program advances to the step 106. The step 106 checks whether or not the data of the current address resides in a predetermined range to detect the presence and absence of an error in the data. This step 106 relates to the error check circuit 31. When the data of the current address resides in the predetermined range, the program advances to a step 107. When the data of the current address resides outside the predetermined range, the program returns to the step 101. The step 107 increments the current address "adrs" to update the current address to the next address. After the step 107, the program returns to the step 102.

The step 108 resets the address value "adrs" to 0. In addition, the step 108 initializes variables used in data adding and averaging processes. A step 109 following the step 108 calculates the address shift amount AS which equals the peak address PA minus a reference address. After the step 109, the program advances to a step 110. The step 110 checks whether or not the current address "adrs" is equal to the final address corresponding to the rear end pixel of the horizontal line. When the current address "adrs" is not equal to the final address, the program advances to a step 111. When the current address "adrs" is equal to the final address, the program advances to a step 115.

The step 111 calculates an access address AC which equals the current address "adrs" minus the address shift amount AS. A step 112 following the step 111 calculates a value SUM which equals the addition result data of the current address "adrs" plus the data of the access address AC. The value SUM will finally represent the resultant of the sum of the data. A step 113 following the step 112 sets the addition result data of the current address "adrs" equal to the value SUM. A step 114 following the step 113 increment the current address "adrs" to update the current address to the next address. After the step 114, the program returns to the step 110.

The step 115 increments the value N representing the number of times of the addition. A step 116 following the step 115 compares the number N with a predetermined number to detect whether or not the data adding process is completed. When the data adding process is not completed, the program returns to the step 101. When the data adding process is completed, the program advances to a step 117. The step 117 calculates an average which equals the addition result data divided by the number of times of the addition for each of the addresses.

DESCRIPTION OF THE FOURTH PREFERRED EMBODIMENT

Figure 10:
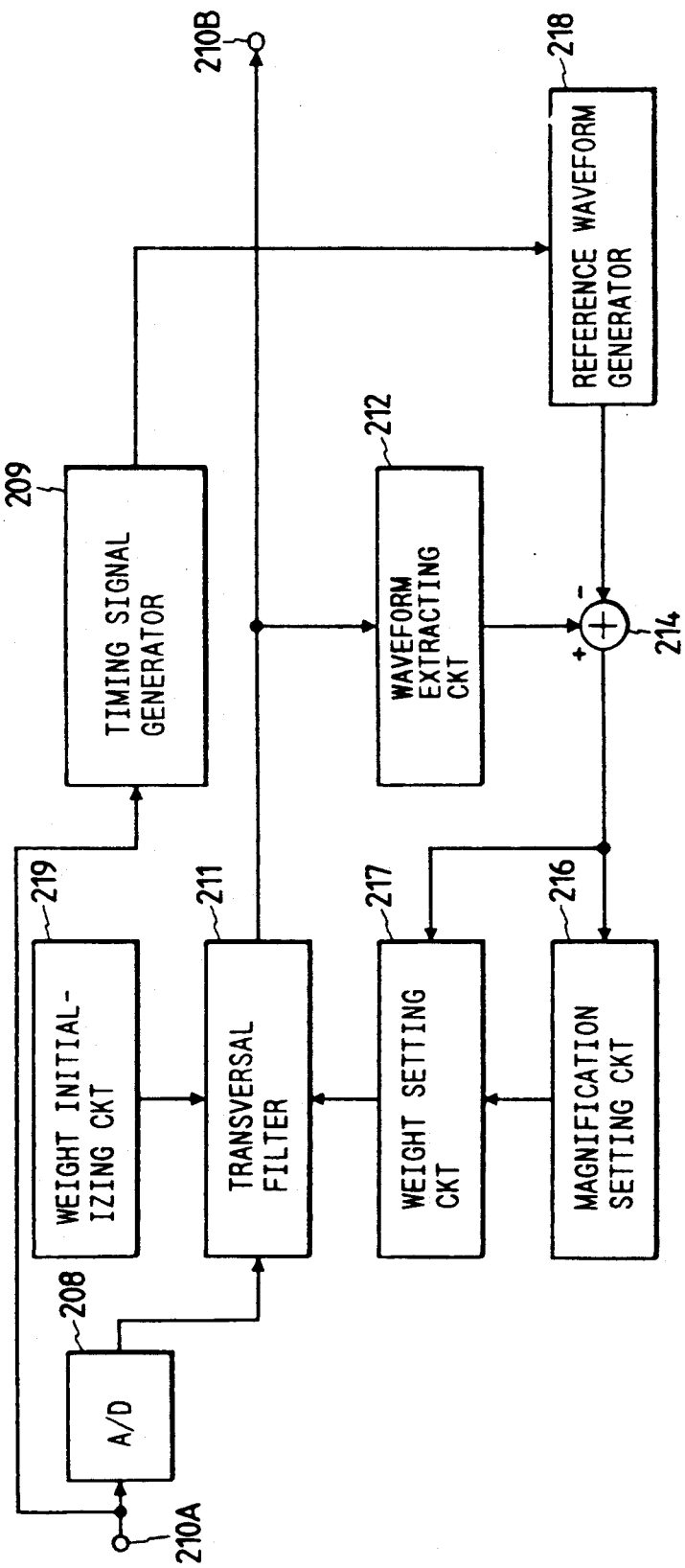
FIG. 10 is a block diagram of a ghost canceler according to a fourth embodiment of this invention.

With reference to FIG. 10, an analog video signal is fed to an analog-to-digital (A/D) converter 208 and a timing signal generator 209 via an input terminal 210A. The A/D converter 208 converts the analog video signal into a corresponding digital video signal.

The digital video signal is fed from the A/D converter 208 to a transversal digital filter 211. The transversal filter 211 processes the video signal with a filtering characteristic to remove ghost components from the video signal. The filtering characteristic is determined by weights which will be explained later. The weights are also referred to as tap gains. The processed digital video signal is fed from the transversal filter 211 to an output terminal 210B.

The transversal filter 211 includes a suitable combination of an FIR filter and the IIR filter. Specifically, the transversal filter 211 has a cascade combination of delay circuits, weighting circuits multiplying signals from respective taps of the delay-circuit cascade combination by respective weights (tap gains), and an adder summing output signals from the weighting circuits and outputting the resultant sum as a filter output signal. The weights or tap gains which determine the filtering characteristic of the transversal filter 211 are initially fed from a weight initializing circuit 219 and are subsequently updated by a weight setting circuit 217.

A waveform extracting circuit 212 receives the output signal from the transversal filter 211. The waveform extracting circuit 212 extracts a waveform of the output signal of the transversal filter 211 which occurs during a predetermined period where a reference signal for ghost cancel is present but display information components are absent. For example, the predetermined waveform-extracting period is one horizontal scanning period in a vertical blanking period. The extraction of the waveform is periodically executed in response to each reference signal extracting pulse fed from the timing signal generator 209. The output signal from the waveform extracting circuit 212 is fed to a subtracter 214.

A reference waveform generator 218 determines an original reference waveform in advance and outputs a signal representing the original reference waveform. For example, the original reference waveform agrees with a differential of a bar waveform of a GCR signal. The GCR signal is transmitted from a TV broadcasting station as a part of a color television signal, and the details of the GCR signal are described in Japanese Magazine "Nikkei Electronics", 1989 8.7 (No. 479), page 121.

The timing signal generator 209 generates various timing signals on the basis of the horizontal sync signal, the vertical sync signal, or another sync signal in the analog video signal. The timing signal generator 209 feeds one of the timing signal to the reference waveform generator 218. The reference waveform generator 218 output the signal of the original reference waveform at a timing determined by the timing signal fed from the timing signal generator 209. The output signal from the reference waveform generator 218 is fed to the subtracter 214.

The subtracter 214 calculates the difference between the output signals from the waveform extracting circuit 212 and the reference waveform generator 218 and outputs an error signal representing the difference between the output signals from the waveform extracting circuit 212 and the reference waveform generator 218. The signal outputted from the reference waveform generator 218 to the subtracter 214 is synchronized with the output signal from the waveform extracting circuit 212 to the subtracter 214 by the operation of the timing signal fed to the reference waveform generator 218.

A magnification setting circuit 216 receives the error signal from the subtracter 214. The magnification setting circuit 216 sets a magnification in accordance with the error signal. The weight setting circuit 217 receives the error signal from the subtracter 214. The weight setting circuit 217 receives an output signal from the magnification setting circuit 216 which represents the magnification. The weight setting circuit 217 determines tap gains in accordance with the error signal and the magnification and outputs a signal representative of the determined tap gains to the transversal filter 211.

At an initial time, the gains of the transversal filter 211 are set to predetermined initial values by the weight initializing circuit 219. For example, the weight initializing circuit 219 includes a ROM storing signals representative of the initial tap gains. During a period following the initial time, the tap gains of the transversal filter 211 are updated and determined by the weight setting circuit 217.

The initial tap gains are chosen so that the transversal filter 211 will exhibit a filtering characteristic passing a frequency band of the ghost cancel reference signal but cutting off signal components having frequencies higher than the frequency band of the ghost cancel reference signal. Therefore, such high-frequency components generally caused by noises are prevented from adversely affecting the ghost cancel operation.

What is claimed is:

1. A ghost canceler comprising:
    a transversal filter filtering an input video signal with a filtering characteristic determined by tap gains;
    a waveform extracting circuit periodically extracting a waveform of a first ghost cancel reference signal contained in the input video signal;
    an average circuit calculating an average of waveforms successively extracted and outputting by the waveform extracting circuit;
    a differentiating filter differentiating an output signal from the average circuit;
    a reference signal generator generating a second ghost cancel reference signal;
    a subtractor deriving a difference between an output signal from the differentiating filter and a waveform of the second reference signal;
    a magnification setting circuit setting a magnification in accordance with an output signal from the subtracter;
    a weight setting circuit generating weighting data on the basis of the output signal from the subtracter and the magnification set by the magnification setting circuit, the weight setting circuit setting the weighting data in the transversal filter as the tap gains; and
    a combination of an error check circuit, a band pass filter, a peak detector, and switch means connected between the waveform extracting circuit and the average circuit;
    the error check circuit generating a first inhibition signal when detecting that the output signal from the waveform extracting circuit has a level different from a predetermined error check threshold level;
    the band pass filter picking up a peak of the output signal from the waveform extracting circuit;
    the peak detector generating a second inhibition signal when the peak picked up by the band pass filter is smaller than a predetermined reference level, the peak detector generating a peak position signal representing a position of the peak;
    switch means for outputting the output signal from the waveform extracting circuit when said first and second inhibition signals are absent, and for outputting "0" when at least one of the inhibition signals from the error check circuit and the peak detector is present;
    the average circuit aligning the peak positions represented by the peak position signal from the peak detector during the calculation of the average.

2. A ghost canceler for a video signal containing periodically-occurring ghost reference signals, the ghost canceler comprising:
    a transversal filter for filtering the video with a controllable filtering characteristic;
    means for extracting the ghost cancel reference signal from the video signal;
    means for judging whether or not a signal level distribution of each of the extracted ghost cancel reference signals is in a predetermined reference range to determine that an extracted ghost cancel reference signal is reliable when a signal level distribution thereof is judged to be in the predetermined reference range, and for determining that an extracted ghost cancel reference signal is unreliable when a signal level distribution thereof is judged to be not in the predetermined reference range;
    means for rejecting the unreliable ghost cancel reference signals and accepting the reliable ghost cancel reference signals, and for controlling the filtering characteristic on the basis of the accepted ghost cancel reference signals; and,
    means for initializing the filtering characteristic of the transversal filter to a predetermined filtering characteristic which passes a frequency band of the ghost cancel reference signal but cuts off signal components having frequencies higher than the frequency band of the ghost cancel reference signal.

3. A ghost canceler for a video signal containing a ghost cancel reference signal, the ghost canceler comprising:
- a transversal filter filtering the video signal with a variable filtering characteristic;
- means for initializing the filtering characteristic of the transversal filter to a predetermined filtering characteristic which passes a frequency band of the ghost cancel reference signal but cuts off signal components having frequencies higher than the frequency band of the ghost cancel reference signal.

4. A ghost canceler comprising:
- a transversal filter filtering an input video signal with a filtering characteristic determined by tap gains;
- an extracting circuit periodically extracting a first ghost cancel reference signal from the input video signal;
- an average circuit for calculating an average of first ghost cancel reference signals successively extracted by the extracting circuit;
- a differentiating filter differentiating an output signal from the average circuit;
- a reference signal generator for generating a second ghost cancel signal reference signal;
- a subtractor receiving an output signal from the differentiating filter and the second reference signal and producing a difference signal therefrom;
- a magnification setting circuit setting a magnification factor in accordance with the difference signal from the subtractor;
- a weight setting circuit generating weighting data on the basis of the difference signal from the subtractor and the magnification factor set by the magnification setting circuit, the weight setting circuit setting the weighting data in the transversal filter as the tap gains;
- means for judging whether or not a signal level distribution of each of the extracted ghost cancel reference signals is in a predetermined reference range, whereby an extracted ghost cancel reference signal is determined to be reliable when said signal level distribution is in the predetermined reference range, and said extracted ghost cancel reference signal is determined to be unreliable when a signal level distribution thereof is not in the predetermined reference range; and,
- means interposed between the extracting circuit and the average circuit and connected to the judging means, for inhibiting an extracted ghost cancel reference signal which is unreliable from entering the average circuit, and for permitting an extracted ghost cancel reference signal which is reliable to enter the average circuit.

5. A ghost canceler comprising:
- a transversal filter filtering an input video signal with a filtering characteristic determined by tap gains;
- an extracting circuit periodically extracting the first ghost cancel reference signal from the input video signal;
- an average circuit for calculating an average of first ghost cancel reference signals successively extracted by the extracting circuit;
- a differentiating filter for differentiating an output signal from the average circuit;
- a reference signal generator generating a second ghost cancel signal reference signal;
- a subtractor deriving a difference between an output signal from the differentiating filter and the second ghost cancel signal reference signal;
- a magnification setting circuit setting a magnification factor in accordance with an output sinal from the subtractor;
- a weight setting circuit generating weighting data on the basis of the output signal from the subtractor and the magnification set by the magnification setting circuit, the weight setting circuit setting the weighting data in the transversal filter as the tap gains;
- means for comparing a level of each of the extracted ghost cancel reference signals with a predetermined reference level; and,
- means interposed between the extracting circuit and the average circuit and connected to the means for comparing for selectively inhibiting and permitting transfer of each of the extracted ghost cancel reference signals to the average circuit in response to a result of said comparing by the comparing means.

* * * * *